United States Patent
Comroe et al.

[11] Patent Number: 5,355,367
[45] Date of Patent: Oct. 11, 1994

[54] ONE CELL RE-USE PATTERN FOR COMMUNICATION SYSTEM SITES

[75] Inventors: Richard A. Comroe, Dundee; Arun Sobti, Wheaton; John E. Major, Barrington, all of Ill.

[73] Assignee: Motorola, Inc., Schaumburg, Ill.

[21] Appl. No.: 459,624

[22] Filed: Jan. 2, 1990

[51] Int. Cl.$^5$ .......................... H04B 7/00; H04Q 7/00
[52] U.S. Cl. ...................... 370/95.1; 379/60; 455/33.1
[58] Field of Search .............. 370/95.1, 95.3, 93, 370/105.1, 109; 455/63, 66, 73, 74, 32.1, 33.1, 33.4, 34.1, 34.2, 53.1, 54.1, 54.2, 56.1, 38.1; 379/58, 59, 60, 63; 375/40; 371/67.1, 69.1

[56] References Cited

U.S. PATENT DOCUMENTS

| | | | |
|---|---|---|---|
| 4,128,740 | 12/1978 | Graziano | 455/33 |
| 4,144,496 | 3/1979 | Cunningham et al. | 455/33 |
| 4,384,362 | 5/1983 | Leland | 455/33 |
| 4,525,861 | 6/1985 | Freeburg | 455/33 |
| 4,545,071 | 10/1985 | Freeburg | 455/33 |
| 4,550,443 | 10/1985 | Freeburg | 455/33 |
| 4,658,435 | 4/1987 | Childress et al. | 370/95.1 |
| 4,696,027 | 9/1987 | Bonta | 379/60 |
| 4,709,376 | 11/1987 | Kage | 371/69.1 |
| 4,726,050 | 2/1988 | Menich et al. | 379/60 |
| 4,766,599 | 8/1988 | Miyazaki | 375/40 |
| 4,797,947 | 1/1989 | Labedz | 455/33 |
| 4,839,923 | 6/1989 | Kotzin | 370/109 |

Primary Examiner—Douglas W. Olms
Assistant Examiner—Alpus H. Hsu
Attorney, Agent, or Firm—Timothy W. Markison

[57] ABSTRACT

Within a communication system having a plurality of communication system sites, each communication system site has a one cell re-use pattern of a limited number of communication resources. Communication units within the communication system utilize a redundant transmission of information such that the geographic separation of communication system sites utilizing the same communication resources is reduced.

34 Claims, 4 Drawing Sheets

| | C/1 REGION No. 1 | C/1 REGION No. 2 | C/1 REGION No. 3 |
|---|---|---|---|
| FIRST COMMUNICATION REGION (1 CELL) | REQUEST HANDOFF TO BETTER SECTOR, OR SECOND COMMUNICATION REGION 608 | CONTINUE COMMUNICATIONS 606 | CONTINUE COMMUNICATIONS 607 |
| SECOND COMMUNICATION REGION (MULTI-CELL) | CONTINUE COMMUNICATIONS 609 | CONTINUE COMMUNICATIONS 610 | REQUEST HANDOFF TO FIRST COMMUNICATION REGION 611 |

FIG. 6B

ONE CELL RE-USE PATTERN FOR COMMUNICATION SYSTEM SITES

TECHNICAL FIELD

The present invention relates generally to communication systems and in particular to communication systems that re-use a limited number of communication resources.

BACKGROUND OF THE INVENTION

Communication systems in, or over, a geographic area typical have a plurality of communication system sites (sites) that re-use a limited number of communication resources to improve the communication system's call capacity. To ensure that re-use of communication resources does not cause interference between calls, sites allocated the same communication resources are geographically separated. By having sufficient geographic separation, the signal strength of other calls using the same communication resource is negligible in comparison, such that very little, if any, interference between the calls will result. However, the geographic separation needed to ensure an adequate interference ratio (negligible interference between calls) limits the call capacity of the communication system because not all of the available communication resources may be used at each site.

To enhance the efficiency of communication resource re-use and to improve call capacity, the sites are divided into sectors, wherein each sector contains a percentage of the available communication resources. By having the sites divided into sectors, the required geographic separation may be reduced while maintaining an adequate interference ratio. For example, U.S. Pat. No. 4,128,740, assigned to Motorola, Inc. discloses a four cell-six sector communication resource re-use pattern. As disclosed, each site is divided into six sectors and each sector contains approximately 1/24 of the available communication resources. For every four sites, the sector-communication resource pattern is repeated, and the sites are orientated to minimize geographic separation while maintaining an adequate interference ratio.

To further improve the call capacity of the communication system, where a call may be any conveyance of information via a communication resource, the communication system may utilize time division multiplexing (TDM). Typically, TDM allows a frequency, or frequency pair, to support several calls simultaneously. This is possible because only a fraction of a digital frame is needed to accurately represent an analog signal, thus several analog signals may be represented within one digital frame. For example, if the digital frame contains four representations of analog signals, a TDM communication system may accommodate four times the number of calls than that of a communication system which only allows one call per frequency, or frequency pair.

The increase in call capacity of a TDM communication system is not without cost. For example, each communication unit affiliated with a TDM communication system must have a high signal to noise ratio and a high interference ratio such that each analog signal representation is recaptured. If the analog signal representations are not recaptured, call degradation will occur. Further, in metropolitan areas, where call traffic may be very high, a TDM communication system may not have the call capacity to accommodate all of the call requests in an appropriate time frame. Therefore, a need exists for a communication system with an improved call capacity that also reduces the signal to noise ratio and the interference ratio requirements of the communication units.

SUMMARY OF THE INVENTION

These needs and others are substantially met by the one cell re-use pattern for communication system sites disclosed herein. The disclosed invention comprises a method for creating a one cell re-use pattern of a limited number of communication resources that is utilized by a communication system having a plurality of communication system sites and plurality of communication units. The method comprises dividing coverage area of each of the plurality of communication system sites into at least one sector, wherein the limited number of communication resources is distributed among the sectors. The plurality of communication system sites are positioned such that at the limits of its coverage area a time variant measurement of a desired call is at most a predetermined value greater than a time variant measurement of an interfering call. To ensure negligible interference between the desired call and the interfering call, at least some of the communication units transceive information redundantly.

In an embodiment of the present invention, each communication system site of a communication system is divided into three sectors, wherein each sector contains an approximately equal number of communication resources. Communication units within a sector transceive information redundantly such that an interference ratio of the communication units is above a first predetermined level. By transceiving the information redundantly, the required geographic separation between communication system sites having the same communication resource re-use pattern is reduced, thereby increasing the call capacity of the communication systems.

In another embodiment of the present invention, each communication system site of a communication system has a first communication region and a second communication region. The first communication region comprises a one cell re-use pattern of a first limited number of communication resources and the second communication region comprises a multi cell re-use pattern of a second limited number of communication resources. A communication resource allocator controls the allocation of the communication resources to requesting communication units. If the requesting communication unit has an interference ratio above a first predetermined level, the communication resource allocator may allocate to the requesting communication unit a communication resource from the first communication region. If the interference ratio is not above the first predetermined level, the communication resource allocator may allocate a communication resource from the second communication region.

BEST MODE FOR CARRYING OUT THE INVENTION

Figure 1:
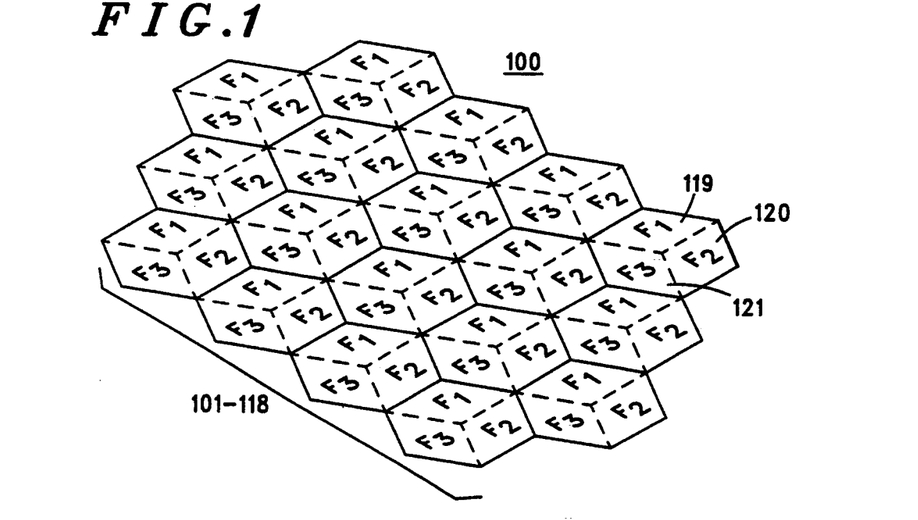
FIG. 1 illustrates a communication system comprising a plurality of communication system sites, wherein each communication system site has a one cell re-use pattern.

FIG. 1 illustrates a communication system (100) in a geographic area comprising a plurality of communication system sites (sites) (101–118), wherein a limited number of communication resources is available to the communication system (100). (Shown are 18 sites, however, a communication system may comprise any number of sites.) Each site (101–118) comprises a one cell re-use pattern of the limited number of communication resources. The communication system (100) may be a conventional, a trunked, or a cellular radiotelephone communication system, wherein the limited number of communication resources may be transceivers operating within a given frequency range having a limited number of available carrier frequencies.

FIG. 1 further illustrates each site (101–118) having a one cell, three sector re-use pattern. The sectors F1 (119), F2 (120), and F3 (121) of each site (101–118) contain a percentage of the limited number of communication resources, such that all of the communication resources are evenly distributed among the sectors (119–121). The sectors (119–121) are shown having a coverage area of approximately 120° and, at their perimeters or limits, are at least partially congruent with the limits of adjacent sectors having the same communication resources. At present, it is contemplated that each site will be divided into three sectors having approximately a 120° coverage area, however, this does not preclude dividing the sites (101–118) into more or less sectors.

Figure 2:
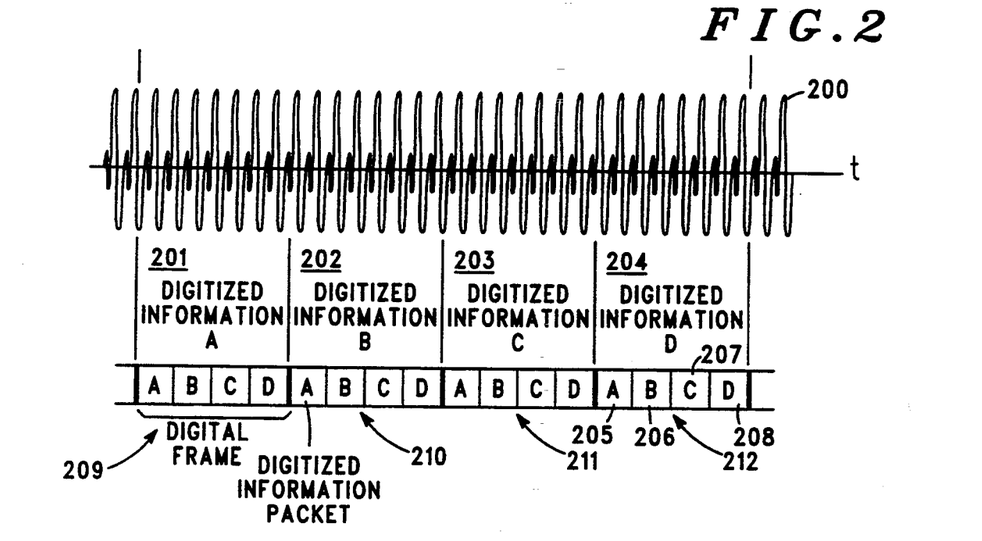
FIG. 2 illustrates a process for digitizing a voice signal into digital information packets and redundantly placing the digital information packets into several digital frames.

FIG. 2 illustrates a process for digitizing an analog signal (200) and redundantly placing it into several digital frames (209–212). The analog signal (200), which may be an audio signal, or nonaudio signal, that is converted into digitized information (201–204), placed within digital information packets (205–208), and is redundantly placed into the digital frames (209–212). The analog signal (200) is converted into digital information at a rate equivalent to the bit rate of the digital frames (209–212) divided by the redundancy rate. For example, if the digital frames (209–212) comprise four digital information packets (205–208), as shown, and are transmitted at 50,000 bits per second (bps), the analog signal is digitized at 50,000/4 or 12,500 bps. The digitized information packets (205–208) further include a site identifier code. (The use of the site identifier code will be discussed below.)

As shown, each digitized information packet (205–208) is placed in four consecutive digital frames (209–212) to produce redundant information, however, the placement of the digitized information packets (205–208) within the digital frames (209–212) may be varied, as well as the number of digitized information packets per digital frame. For example, a digital frame may comprise eight digitized information packets and/or the digitized information may be redundantly placed in only two digitized information packets. From this brief example, it is clear that a relatively large number of digital frames-digitized information packets-redundant digitized information combinations are possible.

By having the digitized information packets redundantly placed in digital frames, communication units are able to effectively operate with a relatively poor signal to noise ratio as well as a relatively poor interference ratio. This is because only one of the four redundant digitized information packets (for example digitized information packet A (205)) needs to be recaptured to accurately reproduce the portion of the analog signal (200) it represents. Therefore, 75% of the information received by a communication unit could be corrupted, without degradation to the user. Further, as a result of the reduced signal to noise and interference ratio requirements, the geographic separation of communication resource re-use pattern is reduced which increases the call capacity of the communication system (100).

Figure 3:
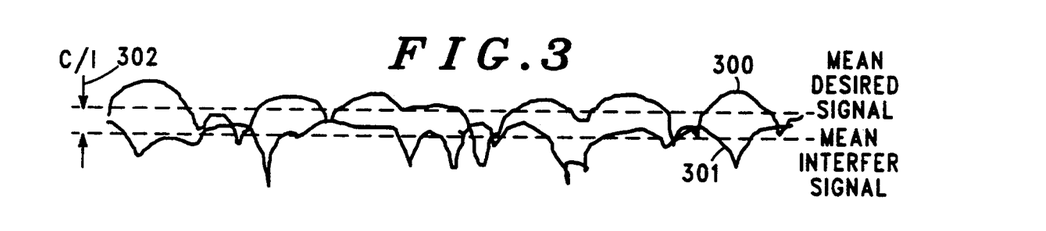
FIG. 3 illustrates a call in one communication system site (desired call) with respect to a call in another communication system site (interfering call) wherein both calls have the same communication resource.

Referring to FIG. 3 and expanding on the above mentioned recapturing rate, the one cell re-use pattern of FIG. 1 is realized. FIG. 3 illustrates the signal strength of a desired call (300) in comparison with the signal strength of a call in another site (interfering call (301)) verses time (horizontal axis). Both calls (300 and 301) are utilizing the same communication resource within their respective sites and are shown as typical Rayleigh faded signals. At the carrier to interference (C/I) point (302) where, at a predetermined value, a time variant measurement of the interfering call (301) is approximately 6 to 7 dB lower than a time variant measurement of the desired call (300), the desired call (300) will statistically be recaptured about 50% of the time. (The time variant measurement may be, for example, the mean of the signal.) Thus, by transmitting the digitized information packets (205–208) redundantly, at least twice, the probability of recapturing the desired call (300) can be made relatively high. Nevertheless, the present embodiment contemplates redundantly transmitting the digitized information packets (205–208) at least four times to minimize the interference ratio requirements, such that little, if any, disturbance of the desired call (300) occurs.

The frequency of the peaks and valleys of the calls (300 and 301) is dependant on the speed at which a communication unit is moving through a real world environment of reflectors and scatterers. If a communication unit is moving slowly, such that for a substantial duration (at least 100 mSec) the desired call (300) cannot be recaptured over the interfering call (301), none of the redundant digitized information packets (205–208) may be recaptured. Under these conditions and through recognition of the site identifier code, the communication unit is prevented from presenting the interfering call (301) to the user. To minimize disturbance under these conditions, the communication unit may use previously recaptured digital information packets to replace the digital information packets that were not recaptured.

Figure 4:
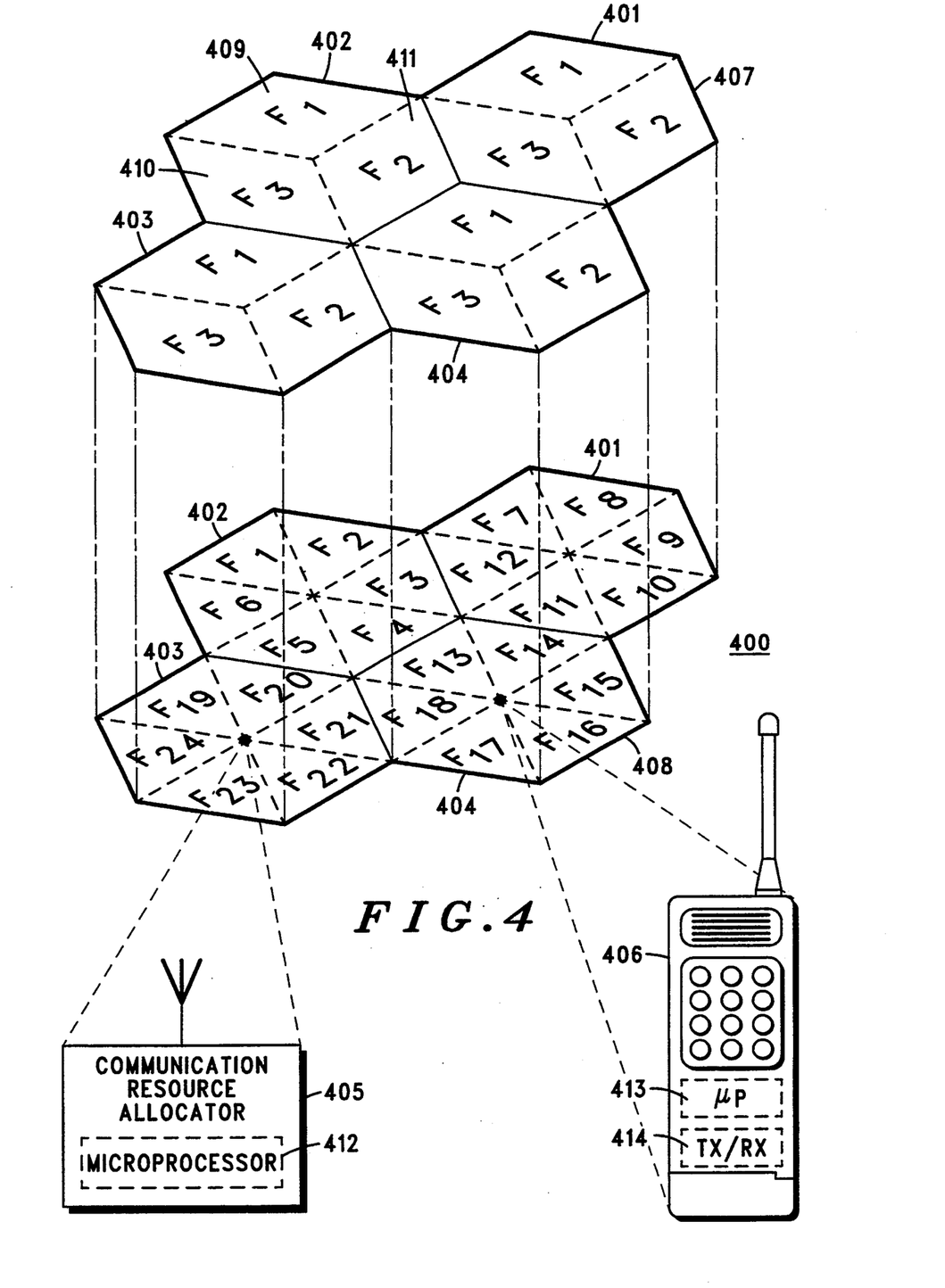
FIG. 4 illustrates a communication system comprising a first communication region having a one cell re-use pattern and a second communication region having a multi-cell re-use pattern.

If a communication unit is immobile, or becomes immobile, it is possible that the interfering call (301) may continually impede the ability to recapture the desired call (300), such that an unacceptable recovery rate occurs. Under such conditions, the present communication resource of the desired call (300) is no longer usable, thus, the call must be transferred to a different communication resource or be terminated. The communication system (400) illustrated in FIG. 4 provides an environment which addresses the above mentioned problem. The communication system (400) comprising a plurality of sites (four shown (401–404)). Each site (401–404) comprises a first communication region (407) and a second communication region (408), wherein a first limited number of communication resources is allocated to the first communication region (407) and a second limited number of communication resources is allocated to the second communication region (408). In each of the sectors of the first communication region (407) and of the second communication region (408), one of the limited number of communication resources is allocated as a control communication resource, such that each sector of each site in each communication region (407 and 408) has an independent control communication resource. The communication system (400) further comprises at least one communication resource allocator (405) and a plurality of communication units (406) (one shown).

The first communication region (407) of each site (401–404) comprises a one cell re-use pattern of the first limited number of communication resources. The one cell re-use pattern comprises at least one sector having the first limited number of communication resources distributed among the sectors. Three sectors F1, F2, and F3 (409–411) are shown. The second communication region (408) of each site (401–404) comprises a multi-cell re-use pattern of the second limited number of communication resources. The multi-cell re-use pattern comprises a four cell six sector re-use pattern of the second limited number of communication resources. The communication resource allocator (405) comprises a microprocessor, or similar computing device, (412) which, at least, controls the allocation of the communication resources in the first and second communication regions (407 and 408) among the plurality of communication units (406). The communication unit (406) comprises a microprocessor, or similar device, (413) which, at least, processes redundant information, (see above discussion on redundant digitized information packets), and determines the interference ratio. The communication unit (406) further comprises a transceiving device (414) for transmitting and/or receiving the redundant information and information related to the interference ratio.

Prior to discussing a process for allocating a communication resource in either the first or second communication regions (407 and 408) to a requesting communication unit (406), a brief description of how the interference ratio may be calculated is presented. As mentioned above, the interference ratio reflects a communication unit's ability to recapture digitized information packets of a desired call in the presence of an interfering call. To determine an interference ratio in the communication system (400) of FIG. 4 or the communication system (100) of FIG. 1, the communication unit (406) attempts to locate the control resources (one in the first communication region and another in the second communication region) for the sector in which it is presently residing. Having located the control communication resources, the communication unit (406) determines the interference ratio of the control communication resources based on the percentage of successfully received digital frames. If the percentage is above a predetermined value (discussed below), the communication unit (406) may, with little, or no interference, communicate within the sector.

Figure 5:
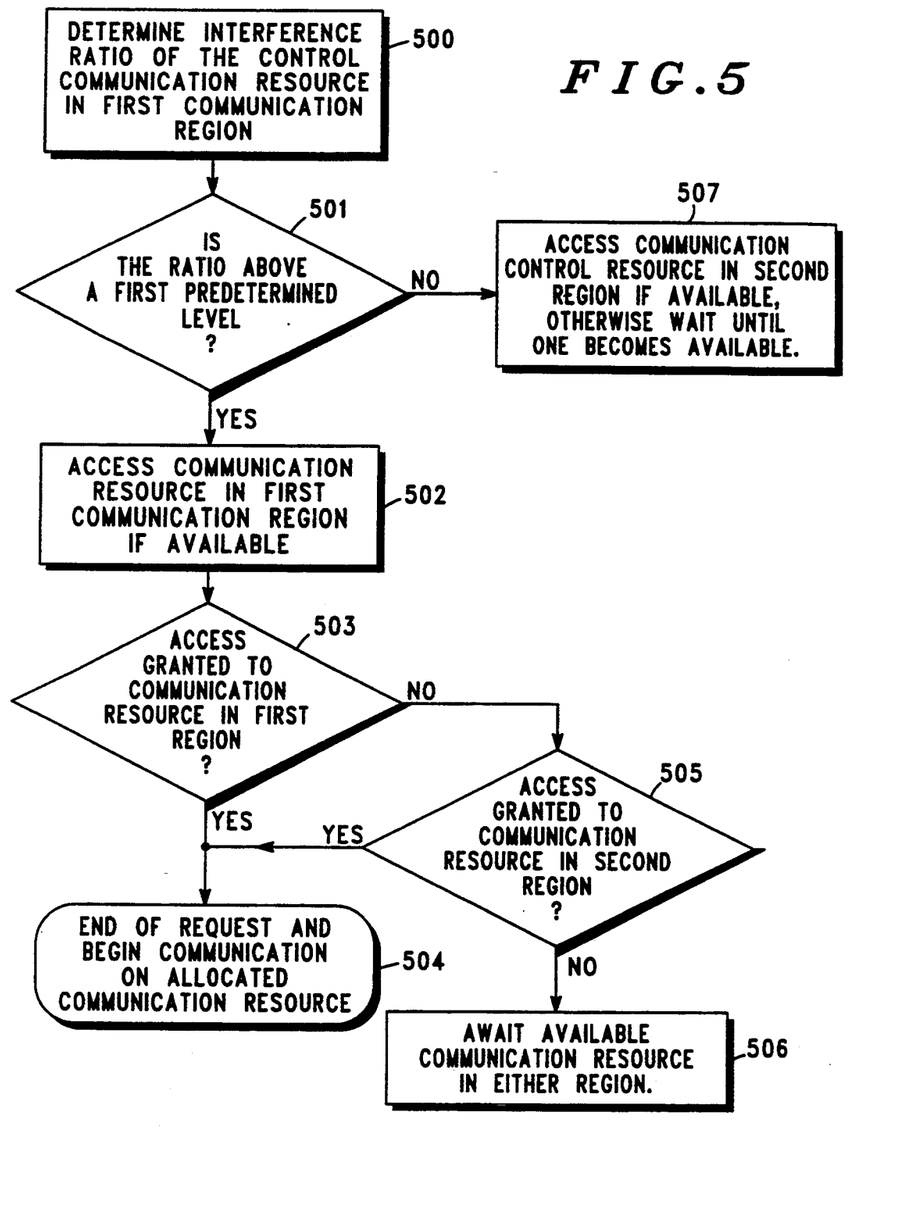
FIG. 5 illustrates a flow diagram of a communication unit accessing either a communication resource within the first communication region or the second communication region.
Figure 6A:
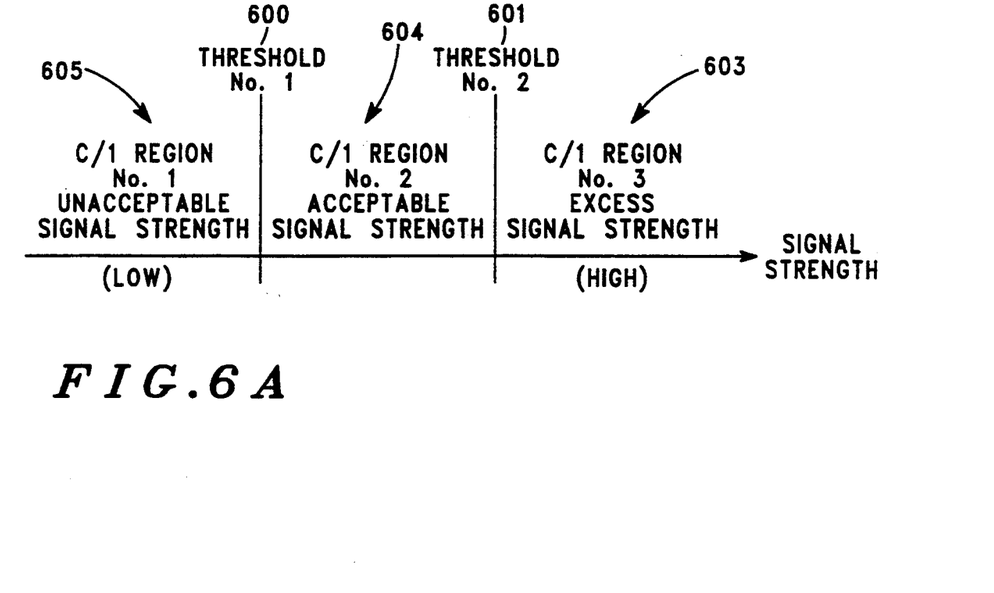
FIGS. 6A and 6B illustrate the transfer of calls from one communication region to the other communication region based on the interference ratio.
Figure 6B:
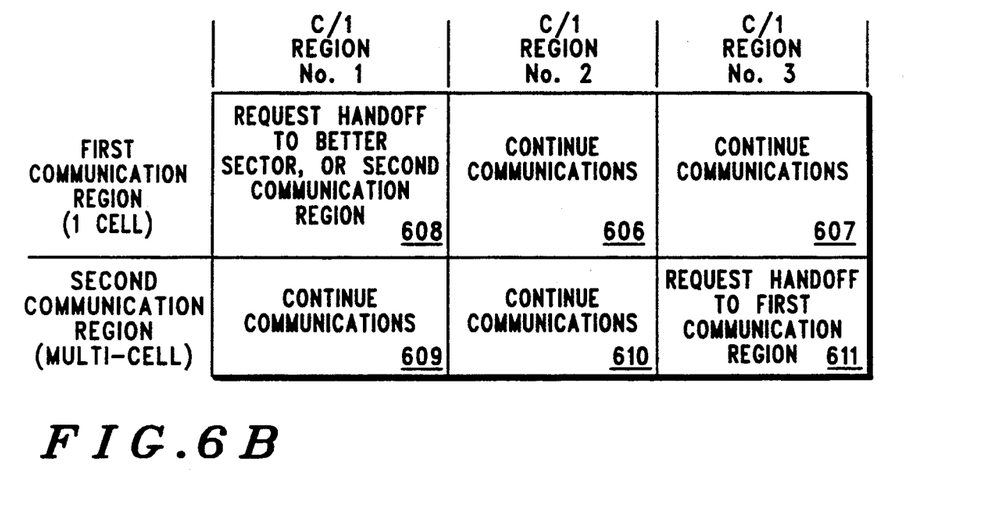

FIGS. 5, 6A, and 6B illustrate a process for allocating a communication resource in either the first or second communication region (407 or 408) to a requesting communication unit (406). At step 500, the communication unit (406) determines the interference ratio of the control communication resource of the sector in the first communication region in which it is presently residing (407). After the interference ratio is determined (500), it is compared against a first predetermined level (600) in step 501, where interference ratios below the first predetermined level (600) have unacceptable signal strengths and interference ratios above the first predetermined level (600) have acceptable signal strengths. Typically, the first predetermined level (600) requires the mean of the desired call be approximately 6 to 7 dB greater than the mean of any interfering call.

If the interference ratio is above the first predetermined level (501), the communication resource allocator (405) may attempt to allocate a communication resource in the first communication region to the requesting communication unit (406) (502). If access is granted (503), the communication resource request is complete and communication may commence on the allocated communication resource (504). If access is not granted (503), the requesting communication unit (406) may be granted a communication resource in the second communication region, if one is available (505). If a communication resource is not available in the second communication region (505), the communication resource allocator (405) may grant the requesting communication unit (406) access to the next available communication resource in either communication region (506). The granting of the next available communication resource may be subjected to a queue waiting list or other prioritization of communication resource accessing.

If the interference ratio is not above the first predetermined level (501), the communication resource allocator (405) may attempt to allocate a communication resource in the second communication region (408) to the requesting communication unit (406) (507). If a communication resource is not immediately available, the requesting communication unit (406) may wait until one becomes available (507).

Once a communication unit (406) has access to a communication resource in either communication region (407 or 408), it may be necessary to switch from one communication region to the other. This process is illustrated in FIGS. 6A and 6B which defines when to hand-off a call from one communication region to another within the same site, however, the handing off of calls from one site to another is also possible as disclosed in U.S. Pat. No. 4,696,027, assigned to Motorola, Inc. Shown in FIG. 6A is a graph of acceptable signal strengths for the one cell re-use pattern of the first communication region (407) in comparison with the first predetermined level, or first threshold, (600) and a second predetermined level, or second threshold, (601). Signal strengths above the second predetermined level (601) are in C/I region 1 (603) where there is excess signal strength. Signal strengths above the first predetermined level (600) and below the second predetermined level (601) are in C/I region 2 (604) where there is acceptable signal strengths. Signal strengths below the first predetermined level (600) are in C/I region 3 (605) where there is unacceptable signal strengths. The second predetermined level (601) may be chosen to best utilize the communication resources in both communication regions (407 and 408), for example, the second predetermined level (601) may require the mean of the desired call to be approximately 13 to 14 dB greater than the mean of the interfering call.

FIG. 6B illustrates the logic for transferring calls from one communication region to another based on the interference ratio with respect to the first communication region (407) in which the communication unit is residing (first interference ratio). (The interference ratio with respect to the second communication region (408) in which the communication unit is residing (second interference ratio) may also be monitored to facilitate the hand-off of calls within the second communication region (408) from site to site, or sector to sector.) When a communication unit (406) is accessing a communication resource in the first communication region (407), the communication continues so long as the interference ratio remains above the first predetermined level (606 and 607). If the interference ratio falls below the first predetermined level, or first threshold, (600) while accessing a communication resource in the first communication region (407), a request for a handoff to a better sector in the first communication region (407) or to the second communication region will be generated (608), where "better" means having an acceptable interference ratio.

If a communication unit (406) is accessing a communication resource in the second communication region (408), the call may continue as long as the first interference ratio is below the second predetermined level (601) as shown in blocks 609 and 610. If the first interference ratio is above the second predetermined level (601), a request for a handoff to the first communication region may be generated (611). If a communication resource is available in the appropriate sector, the call will be transferred to the first communication region (407). If a communication resource is not immediately available, the call continues in the second communication region (408) and may transfer to the first communication region (407) when a communication resource becomes available.

The above discussion was primarily directed toward redundantly transceiving digitized information packets of analog signals, however, digital signals may also be redundantly transceived. In addition, the analog signals may be redundantly transceived using analog methods. For example, the analog signal (200) may be compressed and redundantly transceived. Thus, even though the present best mode contemplates transceiving calls as redundant digital information packets, it is plausible to transceive the calls as redundant analog signals.

What is claimed is:

1. A method for generating a one cell re-use pattern of a limited number of communication resources for a plurality of communication system sites that are within a communication system, wherein the communication system consists of, at least, a plurality of communication units and a communication resource allocator that allocates the limited number of communication resources among the plurality of communication units, the method comprising the steps of:
   a) dividing coverage area of each of the plurality of communication system sites into at least one sector, wherein at least most of the limited number of communication resources are distributed among the at least one sector;
   b) positioning the plurality of communication system sites within the communication system such that, at limits of the coverage area, a time variant measurement of a desired call is at most a predetermined value greater than a time variant measurement of an interfering call; and
   c) transceiving redundant information by at least some of the plurality of communication units such that negligible interference occurs between the desired call and the interfering call.

2. The method of claim 1 wherein step (c) further comprises the substeps of:
   c1) digitizing information that is to be transmitted to produce digitized information; and
   c2) transmitting the digitized information redundantly.

3. The method of claim 2 wherein substep (c1) further comprises placing at least one digitized information packet, which contains at least some of the digitized information, redundantly into a digital frame.

4. The method of claim 2 wherein substep (c1) further comprises placing digitized information packets, which contain at least some of the digitized information, redundantly into several digital frames.

5. The method of claim 1 wherein step (c) further comprises the substeps of:
   c1) receiving the redundant information in digital frames which contain, at least, redundant digitized information packets; and
   c2) recapturing information from at least one of the redundant digitized information packets.

6. The method of claim 5 further comprises receiving a site identifier code.

7. A plurality of communication system sites within a communication system, wherein a limited number of communication resources is available for the plurality of communication system sites, each of the plurality of communication system sites comprises:
   a coverage area divided into at least one sector, wherein the limited number of communication resources are distributed among the at least one sector; and
   a plurality of communication units operably associated with the coverage area, wherein at least some of the plurality of communication units redundantly transceive digitized information packets.

8. The communication system of claim 7 wherein the at least one sector contains an approximately equal number of the limited number of communication resources.

9. A method for a communication unit to transceive calls within a communication system having a plurality of communication system sites, wherein a limited number of communication resources is available for the plurality of communication system sites and wherein at least most of the plurality of communication system sites has a one cell re-use pattern of the limited number of communication resources, the method comprises the steps of:
   a) processing information redundantly to produce redundant information; and b) transceiving the redundant information.

10. The method of claim 9 further comprises:
   b1) receiving the redundant information in digitized form to produce received digitized redundant information; and
   a1) recapturing at least most information from the received digitized redundant information.

11. The method of claim 10 wherein step (b1) further comprises having the received digitized redundant information comprising digitized information packets arranged redundantly in digital frames.

12. The method of claim 11 wherein step (b1) further comprises having at least one of the digitized information packets redundantly contained within at least one of the digital frames.

13. The method of claim 11 wherein step (b1) further comprises having several of the digital frames redundantly containing several of the digitized information packets.

14. The method of claim 9 further comprises:
   a1) digitizing the information to produce digitized information; and
   b1) transmitting the digitized information redundantly to produce digitized redundant information.

15. The method of claim 14 wherein step (b1) further comprises placing the digitized information into digitized information packets which are transmitted in digital frames.

16. The method of claim 15 wherein step (b1) further comprises having at least one of the digitized information packets redundantly contained within at least one of the digital frames.

17. The method of claim 15 wherein step (b1) further comprises having several of the digital frames redundantly containing several of the digitized information packets.

18. A communication unit for use within a communication system having a plurality of communication system sites, wherein a limited number of communication resources is available for the plurality of communication system sites and wherein at least most of the plurality of communication system sites has a one cell re-use pattern of the limited number of communication resources, the communication unit comprises:
   processing means for processing redundant information.
   transceiving means, operably associated with the processing means, for transceiving the redundant information.

19. The communication unit of claim 18 wherein the processing means further comprises means for digitizing the redundant information into digitized information packets, wherein the digitized information packets are redundantly contained within digital frames.

20. The communication unit of claim 19 wherein the processing means further comprises means for placing at least one of the digitized information packets redundantly into at least one of the digital frames.

21. The communication unit of claim 19 wherein the processing means further comprises means for having several of the digital frames redundantly containing several of the digitized information packets.

22. The communication unit of claim 19 wherein the transceiving means further comprises means for recapturing at least most information from the digitized information packets received.

23. The communication unit of claim 22 wherein the transceiving means further comprises means for utilizing previously recaptured digitized information packets when information is not recovered from present digitized information packets.

24. A communication system having a plurality of communication system sites, wherein a first limited number of communication resources and a second limited number of communication resources are available for the plurality of communication system sites and wherein the communication system contains, at least, a communication resource allocator for allocating the first limited number of communication resources and the second limited number of communication resources among a plurality of communication units, each of at least some of the plurality of communication system sites comprises;
   first communication region having a one cell re-use pattern of the first limited number of communication resources;
   second communication region, substantially superimposed on the first communication region, having a multi-cell re-use pattern of at least some of the second limited number of communication resources; and
   at least some of the plurality of communication units transceive redundant information.

25. The communication system of claim 24 wherein the communication resource allocation further comprises means for allocating a communication resource of the first limited number of communication resources, if available, to a requesting communication unit of the plurality of communication units having an interference ratio above a first predetermined level.

26. The communication system of claim 25 wherein the communication resource allocation further comprises means for allocating a communication resource of the at least some of the second limited number of communication resources, when available, to a requesting communication unit of the plurality of communication units having an interference ratio below the first predetermined level.

27. The communication system of claim 25 wherein the communication resource allocation further comprises means for allocating a communication resource of the at least some of the second limited number of communication resources, if available, when none of the first limited number of communication resources are available, otherwise allocating next available communication resource of either the first limited number of communication resources or the at least some of the second limited number of communication resources.

28. The communication system of claim 24 wherein the communication resource allocation further comprises means for transferring a call from a communication resource of the first limited number of communication resources to a communication resource of the at least some of the second limited number of communication resources, if available, when an interference ratio falls below a first predetermined level.

29. The communication system of claim 24 wherein the communication resource allocation further comprises means for transferring a call from a communication resource of the at least some of the second limited number of communication resources to a communication resource of the first limited number of communication resources, if available, when an interference ratio is above a first predetermined level.

30. A method for a communication unit of a plurality of communication units to transceive calls within a communication system having a plurality of communication system sites and a communication resource allocator for allocating a first limited number of communication resources and at least some of a second limited number of communication resources among the plurality of communication units, wherein the first limited number of communication resources and the second limited number of communication resources are available for the plurality of communication system sites, and wherein each of at least some of the plurality of communication system sites consists of first communication region having a one cell re-use pattern of the first limited number of communication resources and a second communication region having a multi-cell re-use pattern of at least some of the second limited number of communication resources, the method comprises the steps of:

a) determining interference ratio information;
b) transmitting interference ratio information;
c) accessing, when available, a control resource of the first limited number of communication resources when the interference ratio is above a first predetermined level, otherwise, accessing, when available, a control resource of the at least some of the second limited number of communication resources.

31. The method of claim 30, wherein the communication unit is accessing a communication resource of the first limited number of communication resources, further comprises the steps of:

c) processing redundant information; and
d) transceiving the redundant information.

32. The method of claim 31 further comprises the steps of:

d1) receiving the redundant information in digitized form as digitized redundant information; and
c) recapturing at least most information from the digitized redundant information.

33. The method of claim 31 further comprises the steps of:

c1) digitizing information to produce digitized information; and
d1) transmitting the digitized information redundantly to produce digitized redundant information.

34. A communication unit of a plurality of communication units that communicates within a communication system having a plurality of communication system sites and a communication resource allocator for allocating a first limited number of communication resources and at least some of a second limited number of communication resources among the plurality of communication units and wherein the first limited number of communication resources and the second limited number of communication resources are available for the plurality of communication system sites, and wherein each of at least some of the plurality of communication system sites consists of first communication region having a one cell re-use pattern of the first limited number of communication resources and a second communication region having a multi-cell re-use pattern of at least some of the second limited number of communication resources, the communication unit comprises:

processing means for processing redundant information when accessing a communication resource of the first limited number of communication resources, and for processing information when accessing a communication resource of the at least some of the second limited number of communication resources;

interference ratio means for determining an interference ratio; and transceiving means, operably associated with the processing means and the interference ratio means, for transceiving the redundant information and the information, and for transmitting the interference ratio.

* * * * *